(12) United States Patent
Bangalore Srinivas et al.

(10) Patent No.: US 12,103,794 B2
(45) Date of Patent: Oct. 1, 2024

(54) STORAGE SYSTEM WITH GUIDED PLATE BASED LIFTING APPARATUS FOR PAYLOAD LOADING-UNLOADING ON STORAGE RACK

(71) Applicant: Tata Consultancy Services Limited, Mumbai (IN)

(72) Inventors: Venkatesh Prasad Bangalore Srinivas, Bangalore (IN); Pradeep Prabhakar Kamble, Bangalore (IN); Maybin Michael, Bangalore (IN); Vineeth Ramanath Kamath, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 135 days.

(21) Appl. No.: 18/093,514

(22) Filed: Jan. 5, 2023

(65) Prior Publication Data

US 2023/0286762 A1    Sep. 14, 2023

(30) Foreign Application Priority Data

Mar. 8, 2022    (IN) .............................. 202221012662

(51) Int. Cl.
*B65G 65/02*        (2006.01)
*B65G 1/04*         (2006.01)
(Continued)

(52) U.S. Cl.
CPC .......... *B65G 65/02* (2013.01); *B65G 1/0428* (2013.01); *B65G 1/0435* (2013.01);
(Continued)

(58) Field of Classification Search
CPC .... B65G 65/02; B65G 1/0428; B65G 1/0435; B65G 1/0485; B65G 1/06; B65G 15/28; B66F 9/063
See application file for complete search history.

(56) References Cited

U.S. PATENT DOCUMENTS 9,592,759 B1 * 3/2017 Theobald ............. B65G 1/0492
10,407,243 B1     9/2019 Prout
(Continued)

FOREIGN PATENT DOCUMENTS

CN      112811060 A  *  5/2021    ........... B65G 1/0492
CN      115303701 A  * 11/2022    ........... B65G 1/0485
WO    WO 2020/169044 A1  8/2020

OTHER PUBLICATIONS

Zaccaria et al., "A Mobile Robotized System for Depalletizing Applications: Design and Experimentation," IEEE Access, 9 (2021).

*Primary Examiner* — James R Bidwell
(74) *Attorney, Agent, or Firm* — Finnegan, Henderson, Farabow, Garrett & Dunner, LLP

(57) ABSTRACT

Storage and retrieval systems demand time and space efficient approaches. Embodiments herein provide a storage system with guided plate based lifting apparatus for payload loading-unloading on storage rack. The system deploys an Automated Guided Vehicle/Autonomous Mobile Robot (AGV/AMR) mounted with multiple lifting apparatuses in between two adjacent storage racks. The racks are modified with guide plates having entry cutouts for horizontal movements and entry guides for vertical movement of lifting apparatus. Ramp provided in the guide plates at the bottom of racks ensures there is enough clearance for lifting apparatus to go inside an aisle and have smooth vertical lifting. Wheel retention mechanism guides the vertical lifting maintaining required clearance. A conveyor belt mechanism mounted to base plate of lifting apparatus consists of geared rotary motor for conveyor belt that has a forward and backward movement, enabling the lifting apparatus to load/unload the payload inside/outside the racks.

4 Claims, 17 Drawing Sheets

(51) Int. Cl.
  *B65G 1/06* (2006.01)
  *B65G 15/28* (2006.01)
  *B66F 9/06* (2006.01)

(52) U.S. Cl.
  CPC ............ *B65G 1/0485* (2013.01); *B65G 1/06* (2013.01); *B65G 15/28* (2013.01); *B66F 9/063* (2013.01)

(56) References Cited

U.S. PATENT DOCUMENTS

| | | | |
|---|---|---|---|
| 11,479,408 B2* | 10/2022 | Kozlenok | B65G 1/0492 |
| 11,589,520 B2* | 2/2023 | Ingram-Tedd | A01G 9/26 |
| 11,596,109 B2* | 3/2023 | Fonseca dos Reis | A01G 27/003 |
| 2018/0250861 A1* | 9/2018 | Ohshiro | B29C 45/42 |
| 2020/0087064 A1* | 3/2020 | Hendrix | B65G 1/0428 |
| 2020/0299060 A1* | 9/2020 | Li | B65G 1/0435 |
| 2021/0380340 A1* | 12/2021 | Qi | G05D 1/0234 |
| 2022/0002122 A1* | 1/2022 | Bangalore Srinivas | B66F 7/14 |

\* cited by examiner

Clearance between roller wheel and guide plate (Zone A,B,C,D)

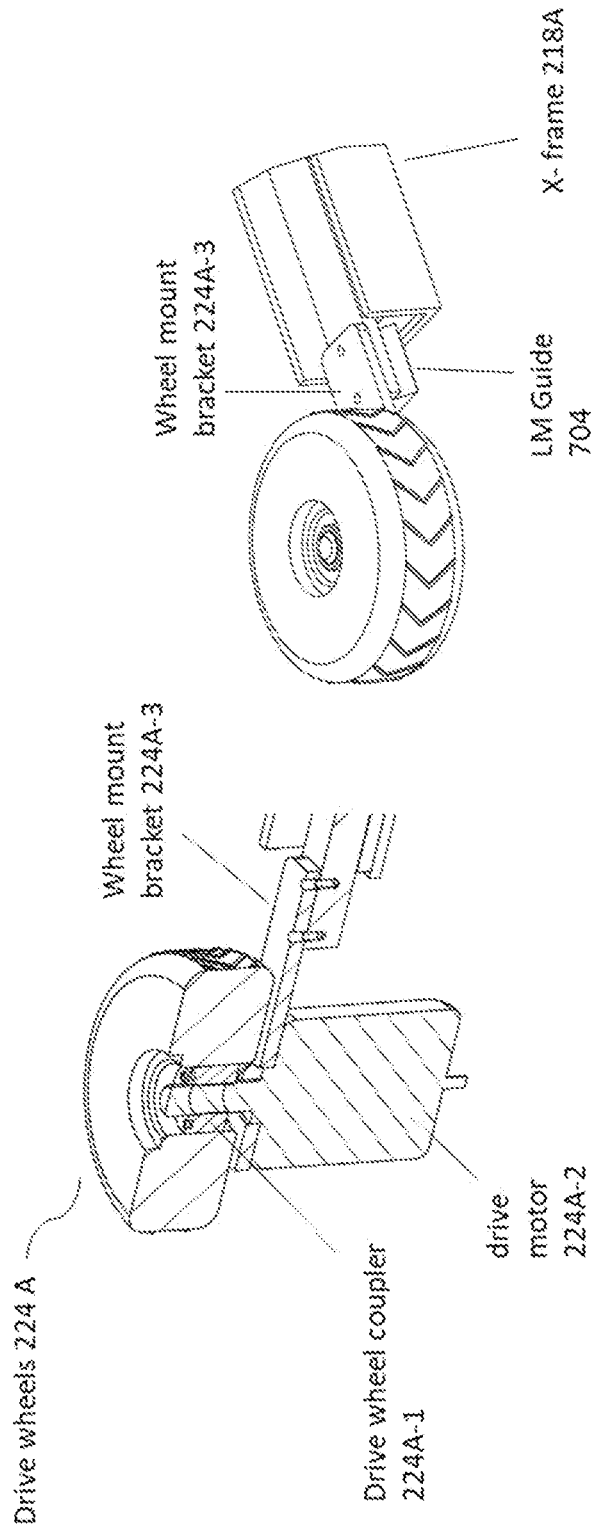

STORAGE SYSTEM WITH GUIDED PLATE BASED LIFTING APPARATUS FOR PAYLOAD LOADING-UNLOADING ON STORAGE RACK

PRIORITY CLAIM

This U.S. patent application claims priority under 35 U.S.C. § 119 to: Indian Patent Application No. 202221012662, filed on Mar. 8, 2022. The entire contents of the aforementioned application are incorporated herein by reference.

TECHNICAL FIELD

The disclosure herein generally relates to the field of automated storage systems, and, more particularly, to a storage system with guided plate based lifting apparatus for payload loading or unloading on a storage rack.

BACKGROUND

Typically, racks in the warehouses are being loaded or unloaded by using manual or semi-automated forklifts. There exist few other techniques in the industries which control an inventory storage and retrieval of goods or payloads such as single deep, double deep and dense storage systems, warehouse shuttle system and the like. However, they are inefficient for payload movement and have a considerable downtime when they need repair.

Autonomous, non-rigid, scalable storage and retrieval systems is an open area for development, which demands time and space efficient storage and retrieval of goods.

SUMMARY

Embodiments of the present disclosure present technological improvements as solutions to one or more of the above-mentioned technical problems recognized by the inventors in conventional systems. For example, in one embodiment, a storage system is provided.

The storage system comprising: (a) a plurality of lifting apparatuses, wherein each of the plurality of lifting apparatuses when at a rest position, locks on a landing platform of an Automated Vehicle (AV), wherein locking is guided by a plurality of male connectors and a plurality of female connectors enabling each of the plurality of lifting apparatuses to self-align a plurality of charging ports on the plurality of lifting apparatuses with a plurality of charging pads provided on the landing platform for charging of each of the plurality of lifting apparatuses when in the rest position, (b) a plurality of guide plates mounted on each corner of each of a plurality of storage racks, wherein each of the plurality of lifting apparatuses is aligned with the plurality of guide plates by the AV via a to and fro movement in an aisle between two storage racks. The guide plates comprises: a plurality of entry cuts provided in the plurality of guide plates for the to and fro movement of the AV mounted with the plurality of lifting apparatuses in the rest position; a plurality of entry guides for each of the plurality of lifting apparatuses for vertical movement along each of the plurality of storage racks guided by the plurality of guide plates; and a plurality of ramps at bottom of the storage racks to smoothen lifting of each of the plurality of lifting apparatuses onto the plurality of guide plates.

Each of the plurality of lifting apparatuses comprising: a base plate at a bottom end holding the charging port on one side and the male connector on other side; a plurality of pipes, with one end of each of the plurality of pipes connected to a plurality of supporting brackets at each corner of the base plate using a plurality of split clamps, and other end of the plurality of pipes is connected to each corner of a top plate using the plurality of split clamps screwed to the top plate; a top cover mounted over the top plate providing an enclosure for electrical and control elements and a battery for powering up and functioning of each of the plurality of lifting apparatuses; a plurality of X frames mounted on the plurality of pipes on one set of opposites sides of the base plate using a plurality of C clamps, each of the plurality of X frame consists of a wheel retention mechanism comprising a timer belt pulley mechanism with a CAM-follower mechanism mounted on each of the plurality of X frame; and a set of drive wheels and a set of follower wheels, controlled by the wheel retention mechanism mounted on each of the plurality of X-frames. Each of the set of drive wheels is powered by a drive motor which is coupled by a drive wheel coupler mounted on a wheel mount bracket, and wherein the set of drive wheels propel the lifting apparatus upwards through the plurality of guide plates while the set of follower wheels follow the set of drive wheels.

The wheel retention mechanism, the timer belt pulley mechanism with the CAM-follower mechanism of each of the X frame comprises: (a) a LM rail and a LM guide, wherein the LM rail is screwed into a slot of the X frame and the LM guide slides over the LM rail, wherein one end of the LM guide is fixed to a flat step of a CAM follower link of a CAM follower of the CAM-follower mechanism and has a solid step at bottom to slide inside a hole provided at one end of the LM rail, wherein the flat step of the CAM follower link is held using a flanged screw, the flanged screw is configured to enable to and fro movement of the CAM-follower mechanism via the slot provided on the flat step of the CAM follower link, wherein the flanged screw is further configured to retain a the CAM follower link coming out from the slot, and wherein the flat step end of the CAM follower link further provides anti-rotational movement for the wheel retention mechanism; (b) a suspension spring mounted over the solid step and held in between the CAM follower link and the LM guide which provides the suspension effect at end of each of the set of driving wheels and the set of follower wheels; and (c) a coil spring, with one end connected to a first pin of a flange bracket which is screwed onto the LM guide and other end is connected to a second pin (718B) which is screwed to the center of the X frame, wherein the coil spring along with LM guide acts as the wheel retention mechanism, and wherein the coil spring is configured to maintain the CAM follower in contact with a CAM and the timer belt pulley mechanism. The CAM with the timer belt pulley mechanism is mounted onto a plurality of bearings and is further coupled to the center of the X frame, and wherein a X frame motor mounted onto the X frame activates or deactivates the CAM-follower mechanism to control spacing between the plurality of guide plates and set of drive wheels and the set of follower wheels.

The storage system further providing a loading unloading mechanism for loading or unloading of a payload via the lifting apparatus, wherein the loading unloading mechanism comprises: a conveyor belt mechanism for a conveyor belt comprising a first end with a powered roller rotated by a conveyor motor mounted to the conveyor belt mechanism and a second end with a free roller, wherein the conveyor belt is supported by an intermediate roller and the free roller to take and guide the payload. A sliding mechanism of the conveyor belt mechanism comprises a sliding mechanism with plurality of guide rods sliding into a plurality of bearing bushes mounted onto the base plate. The sliding mechanism further comprising a rack gear mounted to the sliding mechanism from a bottom side of the conveyor belt mechanism, which is coupled and rotated by a pinion gear and a sliding motor arrangement mounted to the base plate. The pinion gear associated with the sliding motor is directly coupled to the rack gear, wherein rotary motion of the sliding motor converts the sliding motion of the rack gear which slides the sliding mechanism, and wherein the sliding mechanism of the conveyor belt mechanism guides loading or/unloading of the payload inside or/outside a storage space of interest among a plurality of storage spaces arranged vertically in a the storage rack based on the direction of revolution of the conveyor motor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 4B and 4C illustrates sectional view and partial isometric view of a drive wheel and a follower wheel at ends of the X frame respectively, according to some embodiments of the present disclosure.

Figure 1A:
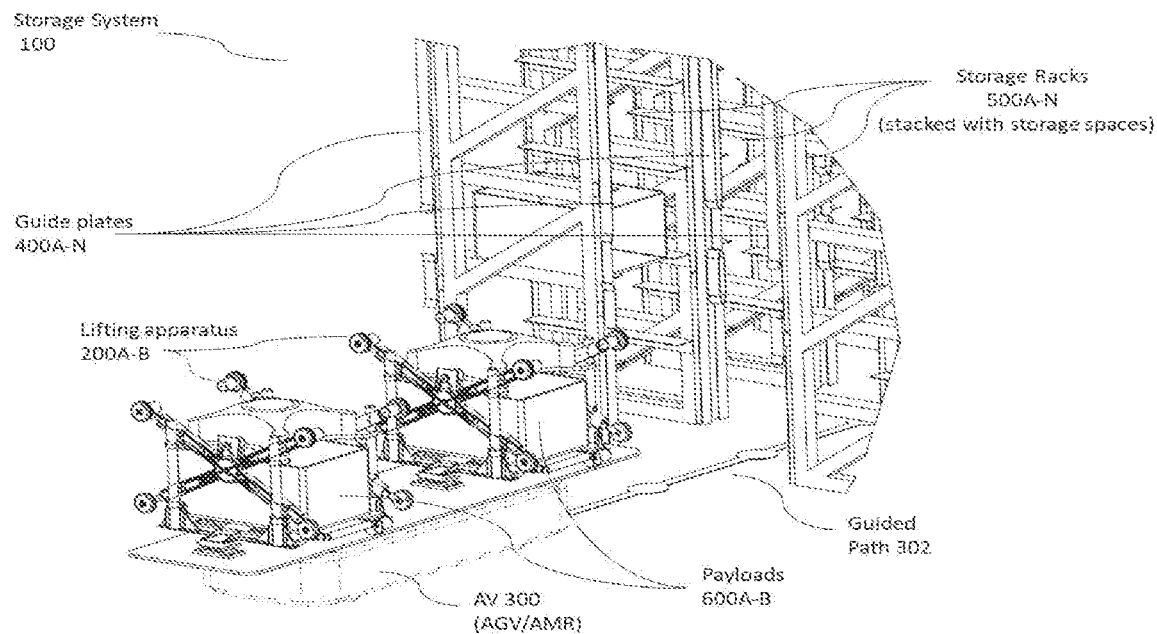
FIG. 1A illustrates a partial isometric view of a storage system comprising a plurality of lifting apparatuses, mounted on an Automated Vehicle (AV) such as an Automated Guided Vehicle/Autonomous Mobile Robot (AGV/AMR) that enters into an aisle in storage racks, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Storage and retrieval systems demands time and space efficient approaches. Embodiments herein provide a storage system with guided plate based lifting apparatus for payload loading-unloading on storage rack. The system deploys an Automated Vehicle such as An Automated Guided Vehicle/Autonomous Mobile Robot (AGV/AMR) mounted with multiple lifting apparatuses in between two adjacent storage racks. The racks are modified with guide plates having entry cutouts for horizontal movements and entry guides for vertical movement of lifting apparatus. Ramp provided in the guide plates at the bottom of racks ensures there is enough clearance for lifting apparatus to go inside an aisle and have smooth vertical lifting. Wheel retention mechanism guides the vertical lifting maintaining required clearance. A conveyor belt mechanism mounted to base plate of lifting apparatus consists of geared rotary motor for conveyor belt that has a forward and backward movement, enabling the lifting apparatus to load or unload the payload inside or outside the racks.

Referring now to the drawings, and more particularly to FIG. 1A through FIG. 7B, where similar reference characters denote corresponding features consistently throughout the figures, there are shown preferred embodiments and these embodiments are described in the context of the following exemplary system and/or method. Reference numerals of one or more components of the autonomous surface crawling robot as depicted in the FIGS. 1A through 7B are provided in Table 1 below for ease of description:

TABLE 1

| Sl. No | Component with alternative name | Numeral reference |
|---|---|---|
| 1 | Storage System | 100 |
| 2 | Plurality of Lifting apparatuses (lifting apparatuses) | 200A-B |
| 3 | Plurality of Male connectors (male connectors) | 202A-B |
| 4 | Plurality of Charging ports (charging ports) | 204A-B |
| 5 | Base plate | 206 |
| 6 | Plurality of Pipes (pipes) | 208A-D |
| 7 | Plurality of Supporting brackets(supporting brackets) | 210A-D |
| 8 | Plurality of Split Clamps (split claims) | 212A-D |
| 9 | Top plate | 214 |
| 10 | Top cover | 216 |
| 11 | Plurality of X frames (X frames) | 218A-B |
| 12 | X frame motor | 218A-1 |
| 13 | Plurality of C clamps (C clamps) | 220A-D |
| 14 | Wheel retention mechanism | 222A-1 |
| 15 | Timer belt pully mechanism | 222A-2 |
| 16 | CAM-follower mechanism | 222A-3 |
| 17 | Set of Drive wheels | 224A-D |
| 18 | Set of Follower wheels | 226A-D |
| 19 | Conveyor belt | 228 |
| 20 | Conveyor motor | 230 |
| 21 | Automated Vehicle (AV) (Automated Guided Vehicle/Autonomous Mobile Robot (AGV/AMR)) | 300 |
| 22 | Guided path | 302 |
| 23 | Landing platform | 304 |
| 24 | Plurality of Female connectors (female connectors) | 306A-B |
| 25 | Plurality of Charging pads (charging pads) | 308A-B |
| 26 | Plurality of Guide plates (guide plates) | 400A-N |
| 27 | Plurality of Entry cuts (entry cuts) | 402A-N |
| 28 | Plurality of Entry guides (entry guides) | 404A-N |
| 29 | Plurality of ramps (ramps) | 406A-N |
| 30 | Plurality of Storage Racks (storage racks) | 500A-N |
| 30 | Payloads | 600A-B |
| 31 | LM rail | 702 |
| 32 | LM guide | 704 |
| 33 | CAM Follower | 706 |
| 34 | CAM follower link | 708 |
| 35 | Flanged screw | 710 |
| 36 | Suspension spring | 712 |
| 37 | Coil spring | 714 |
| 38 | Flange bracket | 716 |
| 39 | Pin of flange bracket (first pin) | 718A |
| 40 | Pin at center of X frame (second pin) | 718B |
| 41 | Solid step | 720 |
| 42 | Bearings | 722A-N |
| 43 | CAM (CAM with timer pulley) | 724 |
| 44 | CAM profile | 726 |
| 45 | Timer belt | 728 |
| 46 | Baffle plate | 730 |
| 47 | Conveyor belt mechanism | 732 |
| 48 | Powered roller | 802A |
| 49 | Free roller | 802B |
| 50 | Intermediate Roller | 802C |
| 51 | Guide rods | 804A-B |
| 52 | Rack gear | 806 |
| 53 | Pinion gear | 808 |
| 54 | Sliding motor | 810 |
| 55 | Motor mount bracket | 812 |

Figure 1B:
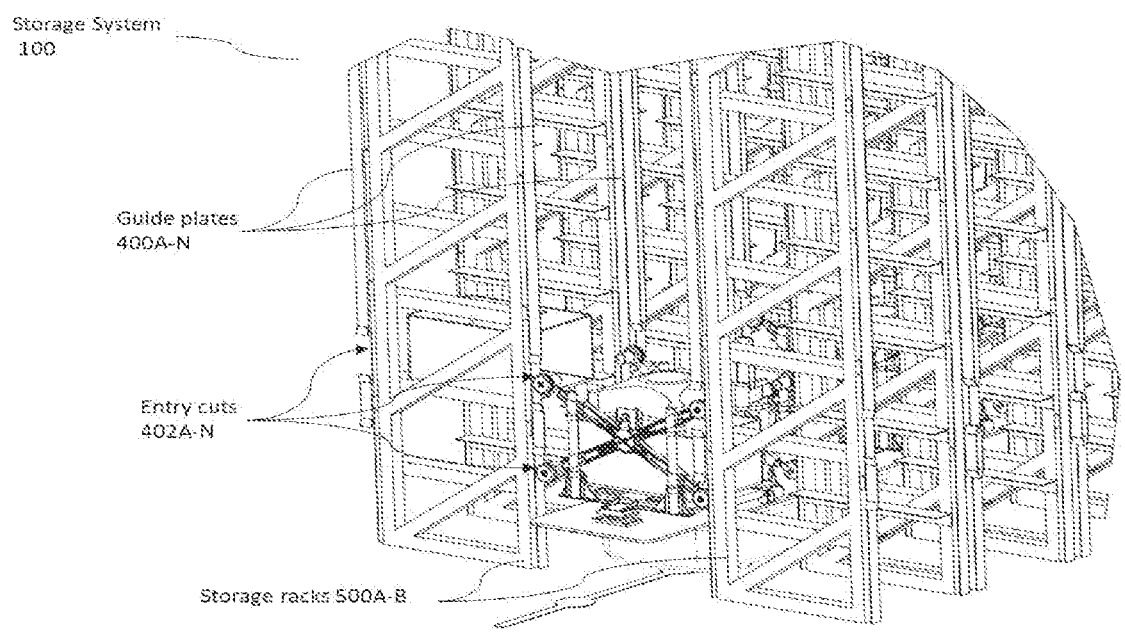
FIG. 1B is a first partial isometric view of the storage system depicting a lifting apparatus at rest position, according to some embodiments of the present disclosure.
Figure 1C:
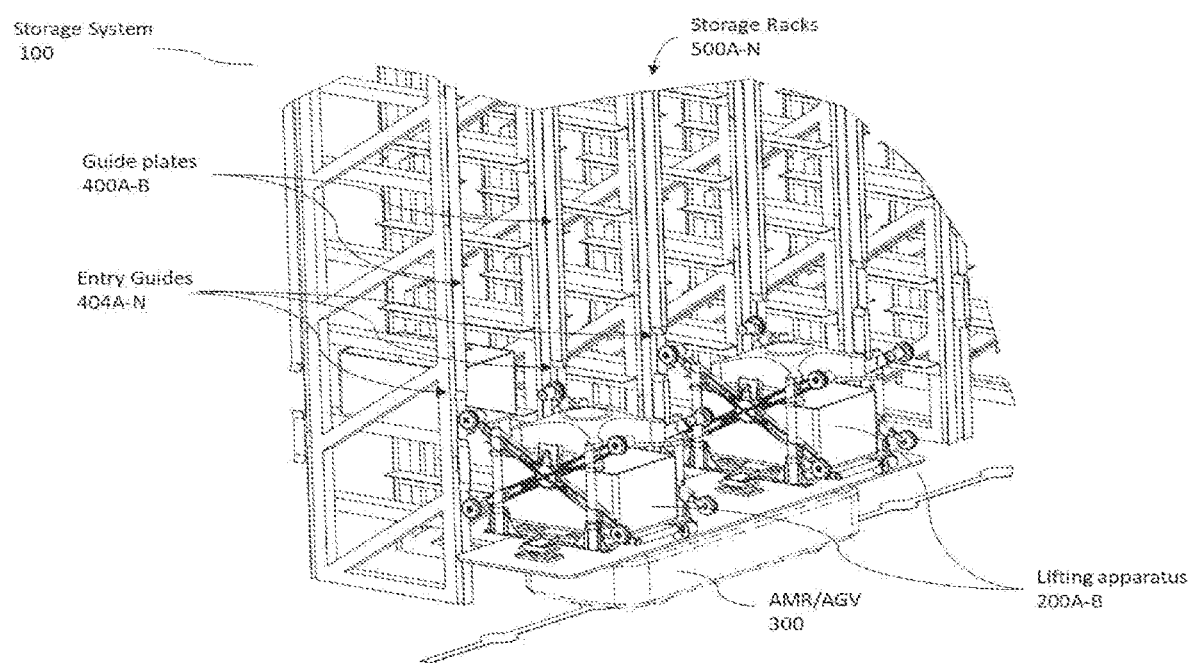
FIG. 1C is a second partial isometric view of the storage system depicting the plurality of lifting apparatuses at rest position inside the aisle, according to some embodiments of the present disclosure.
Figure 1D:
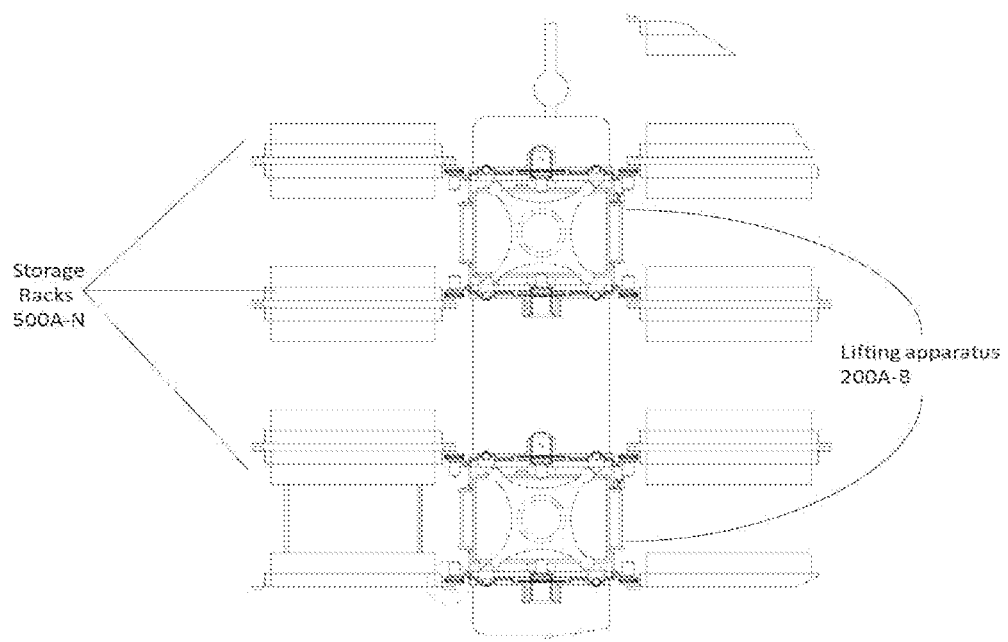
FIG. 1D illustrates a partial top view of the storage system, according to some embodiments of the present disclosure.
Figure 1E:
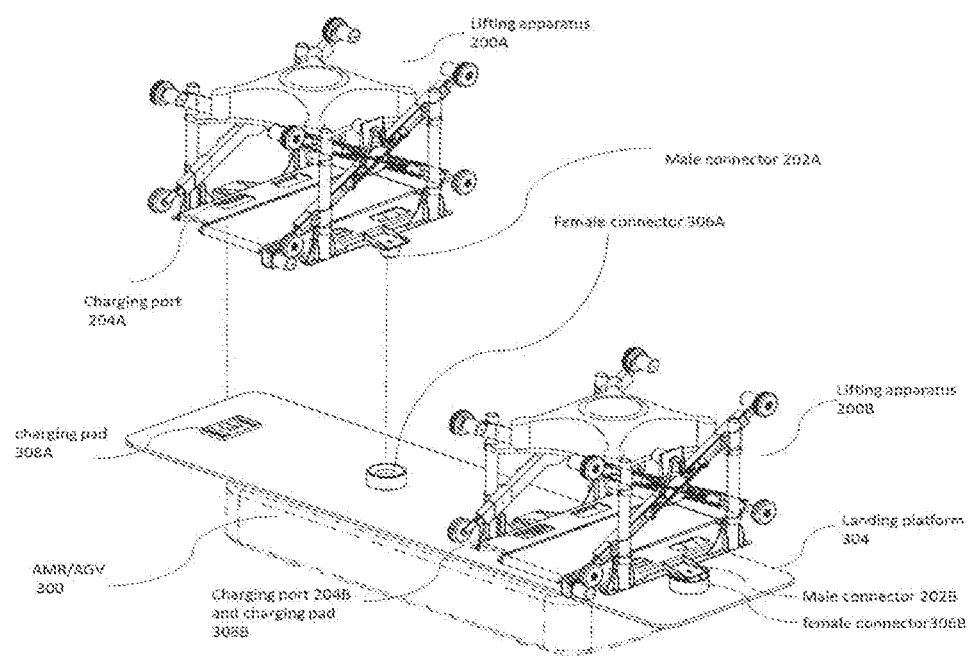
FIG. 1E illustrates an isometric view of electrical and mechanical connection between the AGV/AMR and the lifting apparatus, according to some embodiments of the present disclosure.

FIG. 1A illustrates a partial isometric view (or a perspective view) of a storage system 100 comprising a plurality of lifting apparatuses (200A-B), mounted on an Automated Vehicle (AV) (300), such as an Automated Guided Vehicle/Autonomous Mobile Robot (AGV/AMR) (300) that enters into an aisle in storage racks (500A-N), according to some embodiments of the present disclosure. FIG. 1B is a first partial isometric view of the storage system (100) depicting a lifting apparatus (200A) at rest position, according to some embodiments of the present disclosure. FIG. 1C is a second partial isometric view of the storage system (100) depicting the plurality of lifting apparatuses (200A-B) at rest position inside the aisle, according to some embodiments of the present disclosure. FIG. 1D illustrates a partial top view of the storage system (100), according to some embodiments of the present disclosure. FIG. 1E illustrates an isometric view of electrical and mechanical connection between the AGV/AMR (300) and the lifting apparatus (200A-B), according to some embodiments of the present disclosure. FIGS. 1A through 1E are collectively referred as FIG. 1. Thus, as depicted in FIG. 1 the storage system 100 comprises the plurality of lifting apparatuses (200A-B). Each of the plurality of lifting apparatuses (200A-B) at the rest position locks on a landing platform (304) of the AGV/AMR (300). The AGV/AMR (300) is guided by a guide path (302) into the aisle (narrow passageway between two rows of the storage racks). As depicted in FIG. 1D, locking of the plurality of lifting apparatuses (200A-B) is guided by a plurality of male connectors (202A-B) and a plurality of female connectors (306A-B). The locking enables each of the plurality of lifting apparatuses (200A-B) to self-align a plurality of charging ports (204A-B) on the plurality of lifting apparatuses (200A-B) with a plurality of charging pads (308A-B) provided on the landing platform (304) for charging of each of the plurality of lifting apparatuses (200A-B). Thus, the charging is triggered automatically when the lifting apparatus is at rest position. As depicted in FIGS. 1A through 1C, a plurality of guide plates (400A-N) is mounted on each corner of each of the plurality of storage racks (500A-N). Thus, the storage system (100) disclosed herein has modified storage racks attached with guide plates. Each of the plurality of lifting apparatuses (200A-B) is aligned with the guide plates (400A-N) by the AGV/AMR (300) via a to and fro movement in the aisle between two storage racks (500A-B). Once aligned with the guide plates of the corresponding storage racks, the lifting apparatuses (200A-B) are ready to move upward for loading or unloading of payloads (600A-B).

As depicted in FIG. 1E, the design of the plurality of male connectors (202A-B) and the plurality of female connectors (306A-B) is done in such a way that, as soon as the lifting apparatus (200A) lands onto the landing platform (304) the male connector (202A) enters the female connector (306A) within the clearance band given in between roller wheels of the lifting apparatus (200A) and the plurality of guide plates (400A-B). The roller wheels include a set of drive wheels (224A-D) and a set of follower wheels (226A-D) as explained later in conjunction with FIG. 3, and FIGS. 4A and 4B. With the entry curve feature between the male connector (202A) and the female connector (306A), the lifting apparatus (200A) is able to locate itself. Additionally, at second end rubber pads are also provided with entry chamfer which come and re-locate within the fixed rubber pads. Further, once the lifting apparatus (200A) gets aligned then the charging ports connect to each other. Fixed mounted charging ports are made wide enough to accommodate any lateral errors during the lifting apparatus alignment Referring now to design of the guide plates (400A-N) to guide the vertical movement of the lifting apparatus (200A) from rest position to a lifted position to load/unload a payload (600A) into one of the storage spaces on one of the storage racks (500A-N) is described. As depicted in FIG. 1B, a plurality of entry cuts (402A-N) are provided in the guide plates (400A-N) for the to and fro movement of the AGV/AMR while entering the aisle, while mounted with the plurality of lifting apparatuses (200A-B) in the rest position. As depicted in FIG. 1C, entry guides (404A-N) are provided for each of the plurality of lifting apparatuses (200A-B) for vertical movement along each of the plurality of storage racks (500A-N) guided by the guide plates (400A-N). FIGS.

Figure 2A:
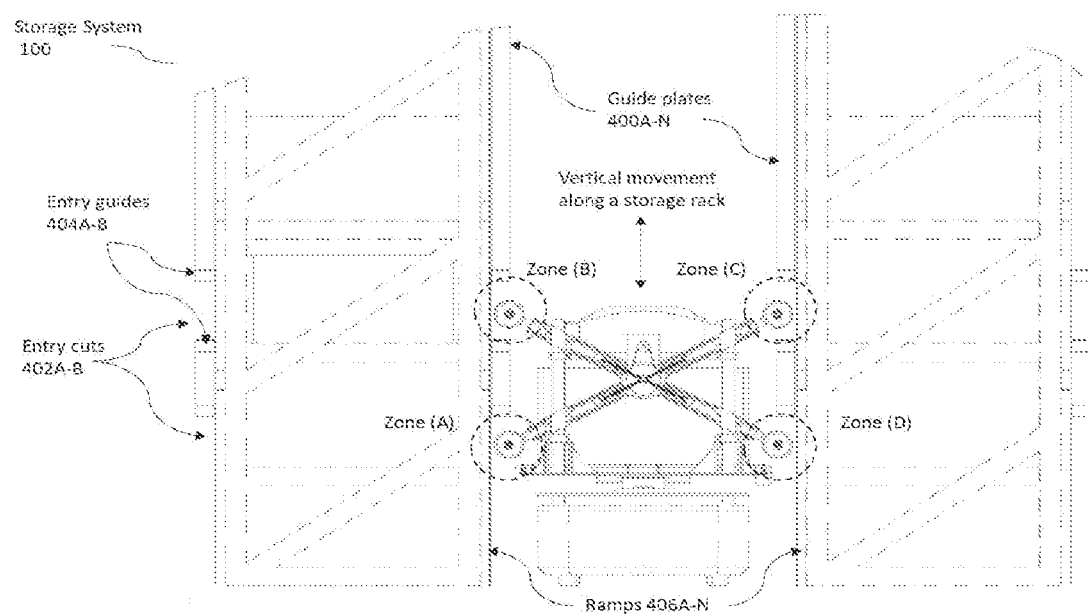
FIGS. 2A, 2B and 2C depict wheel movement of the lifting apparatus during vertical movement between the storage racks in the storage system, according to some embodiments of the present disclosure.
Figure 2B:
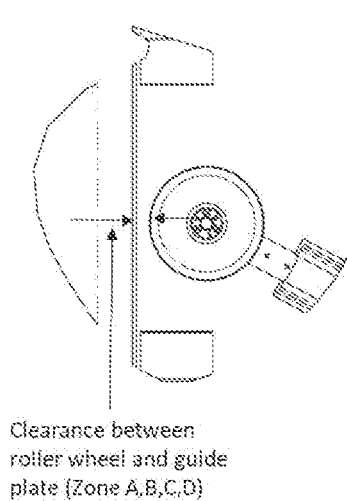
Figure 2C:
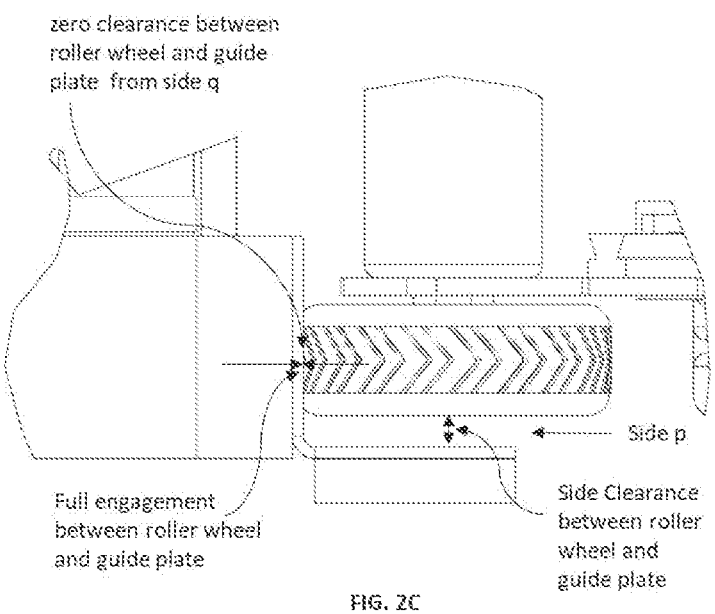
Figure 3:
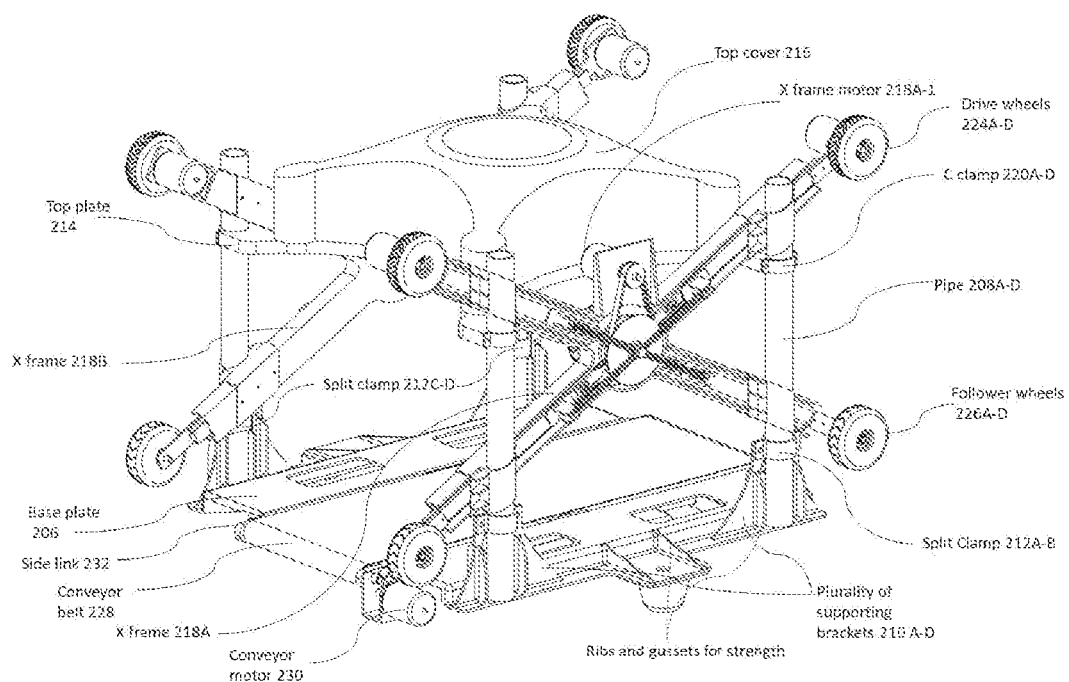
FIG. 3 is an isometric view of the lifting apparatus, according to some embodiments of the present disclosure.

2A, 2B and 2C depict wheel movement of the lifting apparatus during vertical movement between the storage racks in the storage system, according to some embodiments of the present disclosure. FIG. 2A depicts a front view of the storage system (100), wherein roller wheels (set of drive wheels (224A-D) and a set of follower wheels (226A-D) of the lifting apparatus (200A) are in contracted position, that creates a clearance gap between roller wheels and the guide plates (400A-B). FIG. 2B depicts wheel area close up of the storage system (100) to understand clearance between a roller wheel (such as 224A) and a guide plate (400A) (Zone A,B,C,D). FIG. 2C depicts wheel area close-up of the storage system (100) with top view to understand (i) zero clearance between the roller wheel and the guide plate from side q when the roller wheels are in extended position, (ii) full engagement between the roller wheel and the guide plate, and (iii) side clearance between the roller wheel and the guide plate.

Further, as depicted in FIG. 2A ramps (406A-N) at bottom of the storage racks (500A-N) are provided to smoothen lifting of each of the plurality of lifting apparatuses (200A-B) onto the guide plates (400A-N). The ramps (406A-N) are at a height equal to the AGV/AMR (300) with lifting apparatus's height. This ensures there is enough clearance for the lifting apparatus (200A) to go inside the aisle and to smoothen vertical lifting of lifting apparatus as well as horizontal movement of an AGV/AMR at ground level.

Each of the plurality of lifting apparatuses (200A-B) comprises a base plate (206) at a bottom end functioning as a rectangular base frame or as main support plate. In one embodiment, the base plate (206) is made up of composite material to reduce the weight as well as to increase in strength by introducing the plurality of ribs and gussets in the design. The base plate (206) is provided with enough ribs to make part stronger and more rigid. The materials weight is also reduced with additional features by using the composite material. Due to reduction in overall self-weight payload capacity of the lifting apparatus (200A) is increased. The base plate (206) holds the charging port (204A) on one side of the rectangular base frame and the male connector (202A) on other side of the rectangular base frame. A plurality of pipes (208A-D), with one end of each of the plurality of pipes (208A-D) connected to supporting brackets (210A-D) at each corner of the base plate (206) using split clamps (212A-D) are provided. In one embodiment, the plurality of pipes (208A-D) are also made up of the same composite material serving both functions of being light weight and strong. Other end of the plurality of pipes (208A-D) is connected to each corner of a top plate (214) using the split clamps (212A-D) screwed to the top plate (214). A top cover (216) is mounted over the top plate (214) providing an enclosure for electrical and control elements and a battery for powering up and functioning of each of the plurality of lifting apparatuses (200A-B).

Figure 4A:
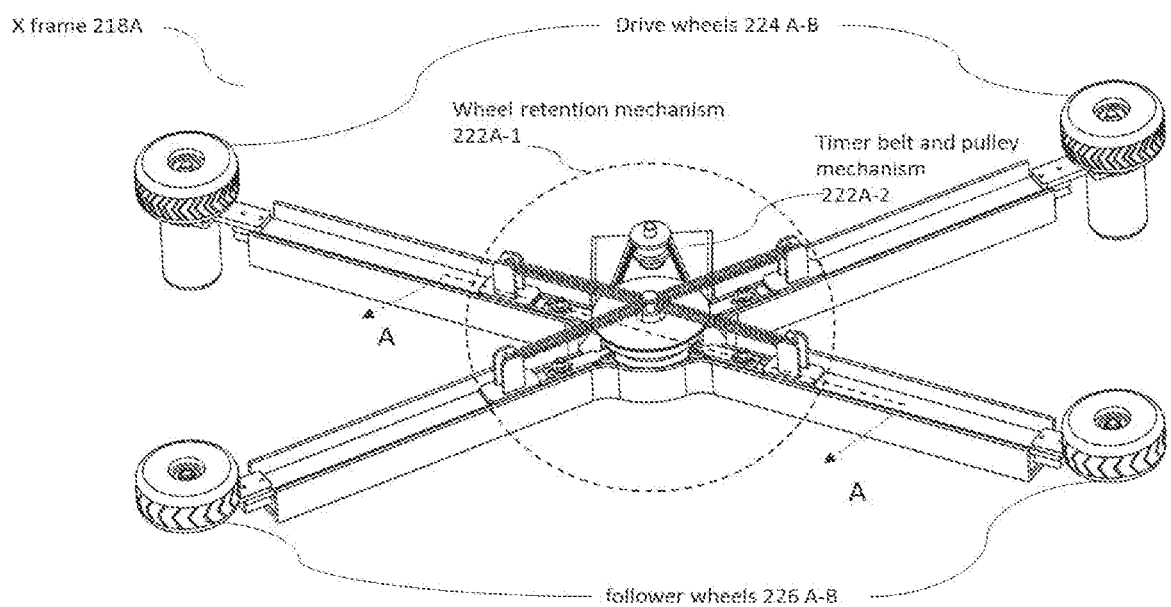
FIG. 4A depicts isometric view of a X frame of the lifting apparatus mounted with a wheel retention mechanism and a timer belt pulley mechanism, according to some embodiments of the present disclosure.

X frames (218A-B) are mounted on the plurality of pipes (208A-D) on one set of opposites sides of the base plate (206) using C clamps (2208A-D). FIG. 4A depicts isometric view of a X frame (218A) of the lifting apparatus (200A) mounted with a wheel retention mechanism (222A-1) and a timer belt pulley mechanism (222A-2), according to some embodiments of the present disclosure. Each of the X frame (218A-B) consists of the wheel retention mechanism (222A-1) comprising the timer belt pulley mechanism (222A-2) with the CAM-follower mechanism (222A-3) mounted on each of the X frame (218A-B, a set of drive wheels (224A-D) and a set of follower wheels (226A-D), controlled by the wheel retention mechanism (222A-1 and 222B-1) mounted on each of the X-frames (218A-B). Each of the set of drive wheels (224A-D) is directly powered by a drive motor (224A-2) which is coupled by a drive wheel coupler (224A-1) mounted on a wheel mount bracket (224A-3). The set of drive wheels (224A-D) propels the lifting apparatus (200A) upwards through the guide plates (400A-B) while the set of follower wheels (226A-D) follows the set of drive wheels (224A-D). FIGS. 4B and 4C illustrates a sectional view and isometric view of a drive wheel and a follower wheel respectively at ends of the X frame 218A, according to some embodiments of the present disclosure.

Figure 5A:
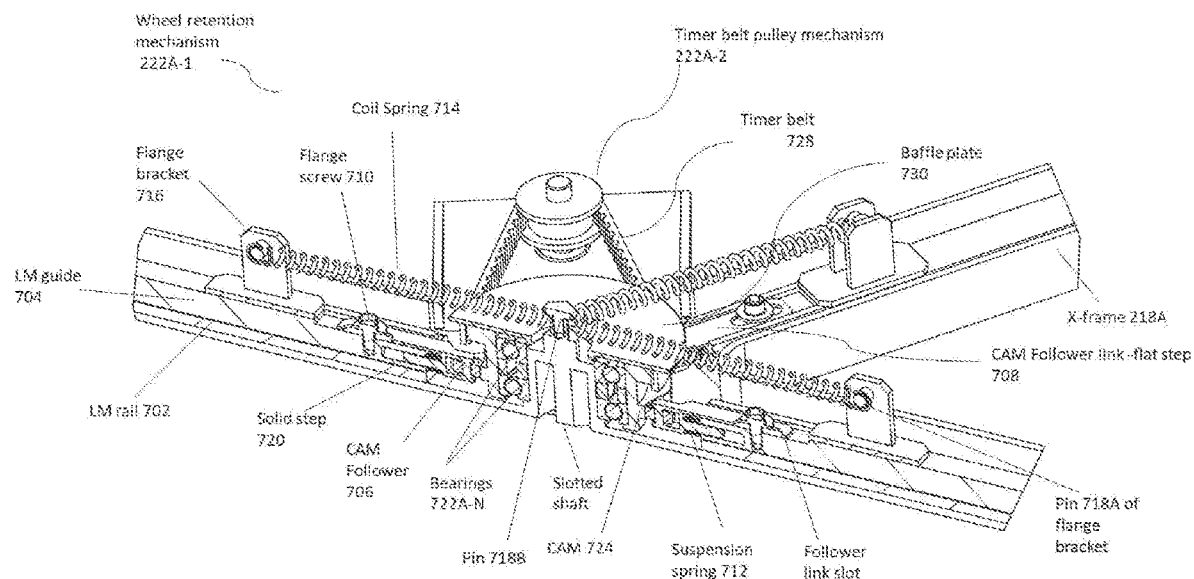
FIG. 5A depicts iso-sectional view of a wheel retention mechanism and a timer belt pulley mechanism for wheel grip action on the guide plates, according to some embodiments of the present disclosure
Figure 5B:
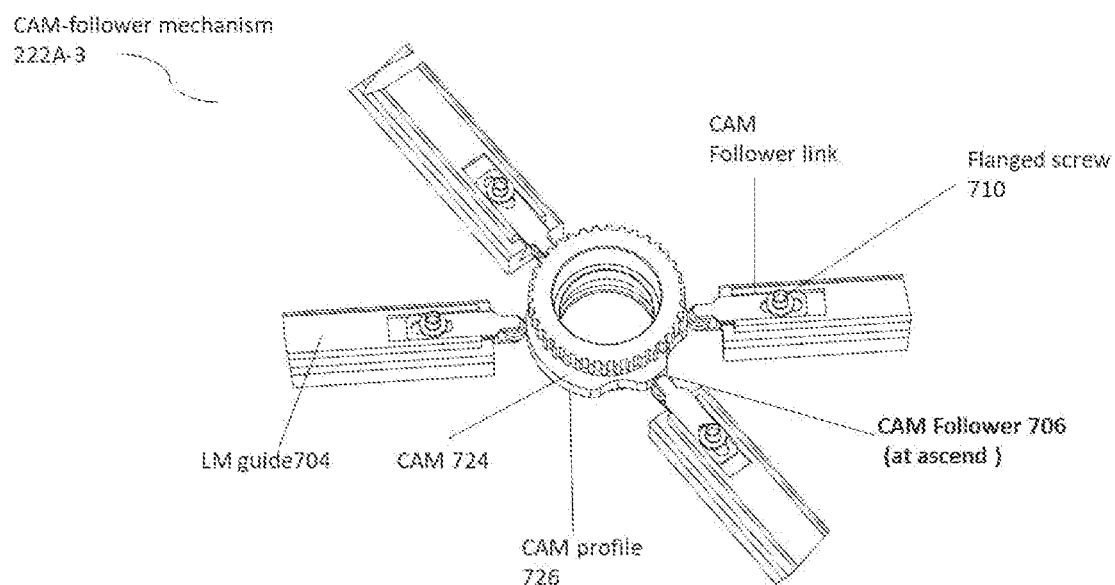
FIGS. 5B and 5C depict partial isometric view of a CAM-follower mechanism for wheel grip action on the guide plates, according to some embodiments of the present disclosure.
Figure 5C:
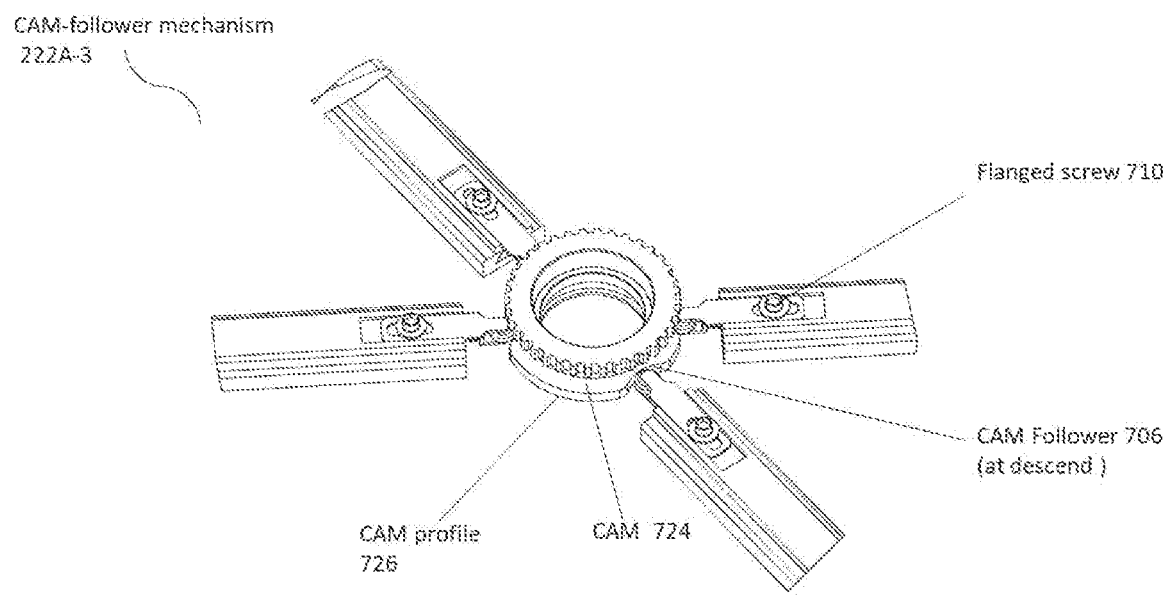

FIGS. 5A, 5B and 5C depict the wheel retention mechanism (222A-1), the timer belt pulley mechanism (222A-2) with the CAM-follower mechanism (222A-3) with a CAM profile (726) of each of the X frame (218A-B) explaining the wheel grip action, which includes:

a) A LM rail (702) and a LM guide (704), wherein the LM rail (702) is screwed into a slot of the X frame (218A) and the LM guide (704) slides over the LM rail (702).

b) One end of the LM guide (704), which is fixed to a flat step of a CAM follower link (708) of a CAM follower (706) of the CAM-follower mechanism (222A-3) and has a solid step (720) at bottom to slide inside a hole provided at one end of the LM rail (702). The flat step of the CAM follower link (708) is held using a flanged screw (710) which allows to and fro movement of the CAM-follower mechanism (222A-3) via the slot provided on the flat step of the CAM follower link (708). The flanged screw (710) retains the CAM follower link (708) coming out from the slot. The flat step end of the CAM follower link (708) also provides anti-rotational movement for the wheel retention mechanism (222A-1).

c) A suspension spring (712) is mounted over the solid step (720) and held in between the CAM follower link (708) and the LM rail (702) which provides the suspension effect at ends of the set of driving wheels (224A-B) and the set of follower wheels (226A-B).

d) A coil spring (714), with one end connected to a first pin (718A) of a flange bracket (716) which is screwed onto the LM guide (704) and other end is connected to a second pin (718B), which is screwed to the center of the X frame (218A). The coil spring (714) along with LM guide (704) acts as the wheel retention mechanism (222A-1), wherein the coil spring (714) always maintains the CAM follower (706) in contact with a CAM (724) and the timer belt pulley mechanism (222A-2).

e) The CAM (724) with the timer belt pulley mechanism (222A-2) is mounted onto a plurality of bearings (722A-N) and is coupled to the center of the X frame (218A), wherein a X frame motor (218A-1) mounted onto the X frame (218A) activates or deactivates the CAM-follower mechanism 222A-3 to control spacing between the plurality of guide plates (400A-N) and set of drive wheels (224A-D) and the set of follower wheels (226A-D).

f) A baffle plate (732) covers the wheel retention mechanism (222A-1).

Figure 6A:
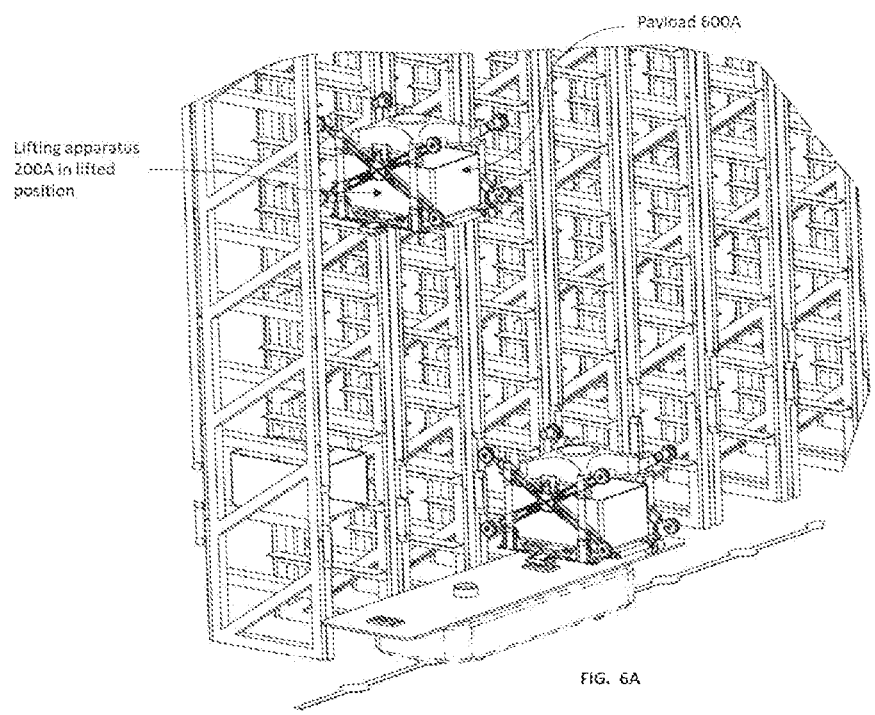
FIGS. 6A and 6B depict a far and close up isometric view of the lifting apparatus in lifted position carrying a payload, according to some embodiments of the present disclosure.
Figure 6B:
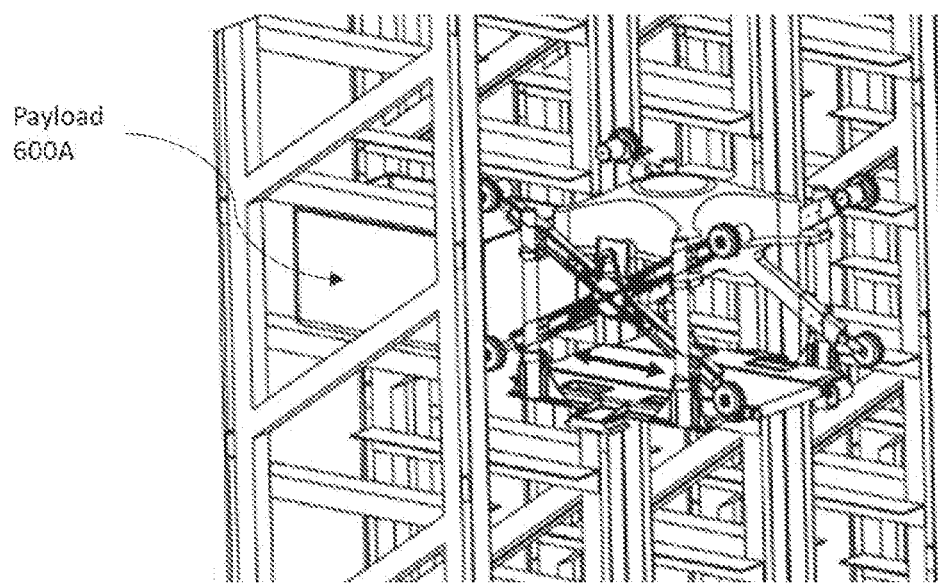
Figure 7A:
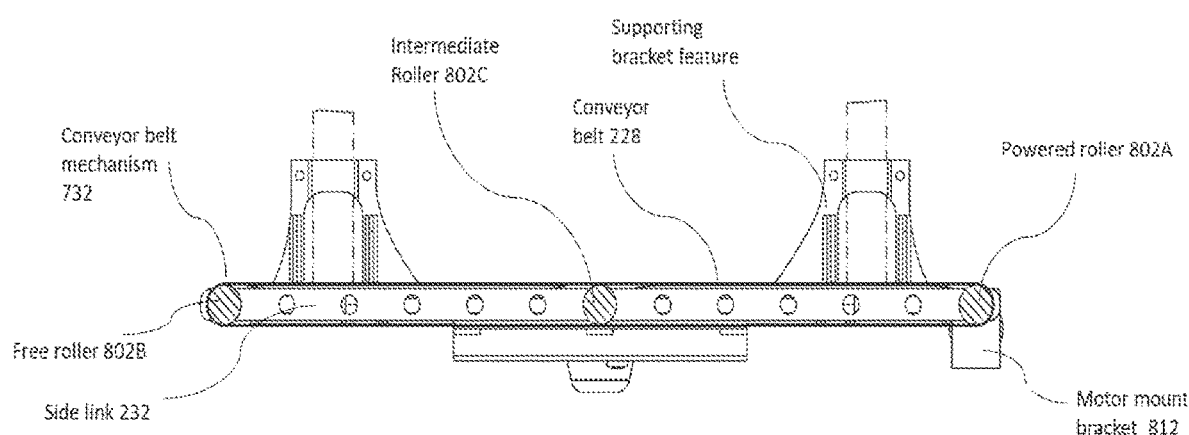
FIGS. 7A and 7B depict sectional view and bottom view respectively of payload loading or unloading mechanism of the lifting apparatus in the lifted position, according to some embodiments of the present disclosure.
Figure 7B:
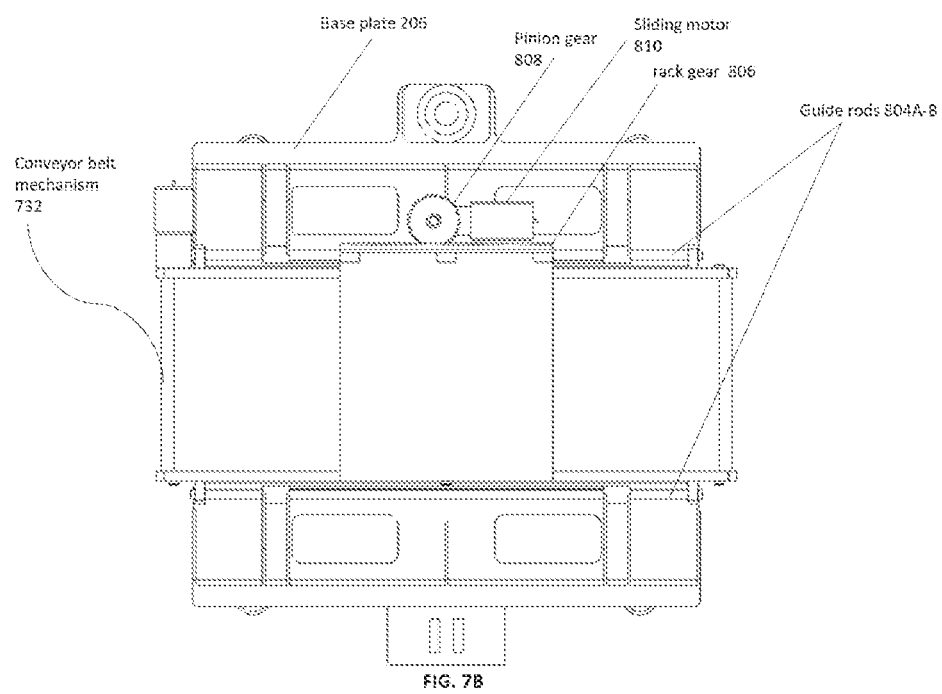

With the structure and mechanism of the storage system 100 described above, the lifting apparatus (200A) can perform vertical upward downward movement from the rest position to a lifted position as depicted in FIGS. 6A (far view) and 6B (close up view) and the mechanism as explained in with conjunction with FIG. 2A. Further, FIGS. 7A and 7B explain sectional view and bottom view respectively of the loading-unloading mechanism of the lifting apparatus (200A) as described below:

a) A conveyor belt mechanism (732) is provided on the lifting apparatus (200A), which controls a conveyor belt (228) comprising a first end with a powered roller (802A) rotated by a conveyor motor (230) mounted to the conveyor belt mechanism using a motor mount bracket (812). A second end is provided with a free roller (802B). The conveyor belt (228) is supported by an intermediate roller (802C) and the free roller (802B) to take and guide the payload (600A).

b) The conveyor belt mechanism (732) driven by sliding mechanism comprises a plurality of guide rods (804A-B) sliding into a plurality of bearing bushes mounted onto the base plate (206). The plurality of guide rods (804A-B) are connected by using plurality of circlips at end. The plurality of guide rods (804A-B) is coupled in between the plurality of bearing bushes provided in the base plate from bottom at four places.

c) A rack gear (806) mounted to the sliding mechanism from a bottom side of the conveyor belt mechanism (732), which is coupled and rotated by a pinion gear (808) and a sliding motor (810) mounted to the base plate (206). The pinion gear (808) associated with the sliding motor (810) is directly coupled to the rack gear (806), wherein rotary motion of the sliding motor (810) converts the sliding motion of the rack gear (806) which slides the conveyor belt mechanism (732) which forms the sliding mechanism. The sliding mechanism of conveyor belt mechanism (732) guides loading or unloading of the payload (600A) inside or outside a storage space of interest among a plurality of storage spaces arranged vertically in a storage rack (500A) based on the direction of revolution of the conveyor motor (230). The sliding mechanism consists of 90-degree power transmission axis in between 90-degree sliding motor (810) or sliding motor (810) with the pinion gear (808) and the rack gear (806).

Functioning of the Storage System 100 for Loading or Unloading of the Payload (600A):

Once the X frame motor is activated, all the four roller wheels (the set of drive wheels (224A-D) and the set of follower wheels (226A-D)) get activated and distance between all the four roller wheels changes (increases/decreases) and in turn changes base of the lifting apparatus (200A). The suspension mechanism as discussed in FIG. 4A generates a spring force with the suspension spring (712), which is greater than that of suspension at the coil spring (714). Purpose of the coil spring (714) is to hold the CAM follower (706) connected with the CAM (724) always. When the CAM (724) is activated (the CAM follower (706) is at ascend) the stroke/base of the roller wheels increases. Further, when CAM (724) is deactivated (the CAM follower (706) is at descend) and the stroke/base of the roller wheels decreases. The activation, and deactivation is achieved by timer belt pulley mechanism (222A-2) with help of a X frame motor (218A-1) mounted onto the X frame (218A) and having pulley coupled to it at one end. The CAM (724) with timer pulley of the timer belt pulley mechanism (222A-2) is mounted on the plurality of bearings (722A-N), which is further coupled to the center of the X frame (218A) using spacer.

When the X frame motor (218A-1) is powered the torque transfers from motor pulley to the CAM (724) with timer pulley through timer belt (728). The X frame motor (218A-1) can be rotated in clockwise (CW) and counterclockwise (CCW) to activate or deactivate the cam (724) and cam follower (706) together to increase or decrease the wheelbase respectively. Once the CAM (724) and the CAM follower (706) activates, all the roller wheels mounted on LM rail (702) expand or contract based on actuation of the CAM-follower mechanism (222A-3). This increase or decrease in wheelbase helps the lifting apparatus (200A) to climb in vertical direction by providing required amount of force required at four-wheel points and also helps the lifting apparatus (200A) with AMR to enter the aisle.

As explained above in FIG. 2C, there is a zero clearance at side q—indicating that there is pressurized connection between the roller wheels and guide plates (400A-B) which helps the lifting apparatus (200A) to move in vertical direction. But there is enough clearance provided sidewise i.e., side p between wheel and guide plate to prevent (or refrain) rubbing of roller wheel (each of the set of drive wheels (224A-D) and a set of follower wheels (226A-D) on side face of the guide plates (400A-N).

It can be noted that, the AGV/AMR (300) is shown to have only two lifting apparatuses (200 A-B), only for purpose of demonstration. However, the AGV/AMR (300) can be designed to have multiple such units. Capability of the storage system disclosed herein, to mount multiple lifting apparatuses enables simultaneous loading unloading for multiple storage racks. Further, any faulty lifting apparatus is easily detachable at the male connector-female connector assembly. Thus, can be instantly taken away for repair, without any downtime, which may otherwise halt the storage and retrieval process of the payloads. This is because the AGV/AMR can realign the second, third lifting apparatuses that are in working conditions and continue the payload movement in a desired storage rack. Further, charging being present onboard of the AGV/AMR, the lifting apparatus has no downtime for charging requirement. Additionally, unlike forklift type existing mechanisms, there is no limit for vertical height to which the payload can be lifted by the lifting apparatus. Similarly, since the AGV/AMR is free to move across long horizontal paths, the storage space offered by the storage system disclosed herein is scalable vertically and horizontally. Furthermore, regular available storage stacks with minimal modification of guide plates attachment can be easily used to make them suitable for the lifting apparatus based storage and retrieval of goods. Thus, enables easy upgrade of existing storage and retrieval mechanisms.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A storage system comprising:
   a plurality of lifting apparatuses, wherein each of the plurality of lifting apparatuses when at a rest position, locks on a landing platform of an Automated Vehicle (AV), wherein locking is guided by a plurality of male connectors and a plurality of female connectors enabling each of the plurality of lifting apparatuses to self-align a plurality of charging ports on the plurality of lifting apparatuses with a plurality of charging pads provided on the landing platform for charging of each of the plurality of lifting apparatuses when in the rest position;
   a plurality of guide plates mounted on each corner of each of a plurality of storage racks, wherein each of the plurality of lifting apparatuses is aligned with the plurality of guide plates by the AV via a to and fro movement in an aisle between two storage racks, and wherein the guide plates comprise:
      a plurality of entry cuts provided in the plurality of guide plates for the to and fro movement of the AV mounted with the plurality of lifting apparatuses in the rest position;
      a plurality of entry guides for each of the plurality of lifting apparatuses for vertical movement along each of the plurality of storage racks guided by the plurality of guide plates; and
      a plurality of ramps at bottom of the storage racks to smoothen lifting of each of the plurality of lifting apparatuses onto the plurality of guide plates; and
   each of the plurality of lifting apparatuses further comprising:
      a base plate at a bottom end holding the charging port on one side and the male connector on other side;
      a plurality of pipes, with one end of each of the plurality of pipes connected to a plurality of supporting brackets at each corner of the base plate using a plurality of split clamps, and other end of the plurality of pipes is connected to each corner of a top plate using the plurality of split clamps screwed to the top plate;
      a top cover mounted over the top plate providing an enclosure for electrical and control elements and a battery for powering up and functioning of each of the plurality of lifting apparatuses;
      a plurality of X frames mounted on the plurality of pipes on one set of opposites sides of the base plate using a plurality of C clamps, each of the plurality of X frame consists of a wheel retention mechanism further comprising a timer belt pulley mechanism with a CAM-follower mechanism mounted on each of the plurality of X frame; and
      a set of drive wheels and a set of follower wheels, controlled by the wheel retention mechanism mounted on each of the plurality of X-frames, wherein each of the set of drive wheels is powered by a drive motor which is coupled by a drive wheel coupler mounted on a wheel mount bracket, and wherein the set of drive wheels propel the lifting apparatus upwards through the plurality of guide plates while the set of follower wheels follow the set of drive wheels.

2. The storage system of claim 1, wherein the wheel retention mechanism, the timer belt pulley mechanism with the CAM-follower mechanism of each of the X frame comprises:
   a LM rail and a LM guide, wherein the LM rail is screwed into a slot of the X frame and the LM guide slides over the LM rail,
      wherein one end of the LM guide is fixed to a flat step of a CAM follower link of a CAM follower of the CAM-follower mechanism and has a solid step at bottom to slide inside a hole provided at one end of the LM guide, wherein the flat step of the CAM follower link is held using a flanged screw, the flanged screw is configured to enable to and fro movement of the CAM-follower mechanism via the slot provided on the flat step of the CAM follower link, wherein the flanged screw is further configured to retain the CAM follower link coming out from the slot, and wherein the flat step end of the CAM follower link further provides anti-rotational movement for the wheel retention mechanism;

a suspension spring mounted over the solid step and held in between the CAM follower link and the LM guide which provides the suspension effect at end of each of the set of driving wheels and the set of follower wheels; and a coil spring, with one end connected to a first pin of a flange bracket which is screwed onto the LM guide and other end is connected to a second pin which is screwed to the center of the X frame, wherein the coil spring along with LM guide acts as the wheel retention mechanism, and wherein the coil spring is configured to maintain the CAM follower in contact with a CAM and the timer belt pulley mechanism, wherein the CAM with the timer belt pulley mechanism is mounted onto a plurality of bearings and is further coupled to the center of the X frame, and wherein a X frame motor mounted onto the X frame activates or deactivates the CAM-follower mechanism to control spacing between the plurality of guide plates and set of drive wheels and the set of follower wheels.

3. The storage system of claim 1, further comprising providing a loading unloading mechanism for loading or unloading of a payload via the lifting apparatus, wherein the loading unloading mechanism comprising:

a conveyor belt mechanism for a conveyor belt further comprising a first end with a powered roller rotated by a conveyor motor mounted to the conveyor belt mechanism and a second end with a free roller, wherein the conveyor belt is supported by an intermediate roller and the free roller to take and guide the payload;

the conveyor belt mechanism comprises a sliding mechanism with plurality of guide rods sliding into a plurality of bearing bushes mounted onto the base plate; a rack gear mounted to the sliding mechanism from a bottom side of the conveyor belt mechanism, which is coupled and rotated by a pinion gear and a sliding motor mounted to the base plate, wherein the pinion gear associated with the sliding motor is directly coupled to the rack gear, wherein rotary motion of the sliding motor converts the sliding motion of the rack gear which slides the sliding mechanism, and wherein the sliding mechanism guides loading or unloading of the payload inside or outside a storage space of interest among a plurality of storage spaces arranged vertically in the storage rack based on the direction of revolution of the conveyor motor.

4. The storage system of claim 1, wherein the AV is one of an Automated Guided Vehicle (AGV) and an Autonomous Mobile Robot (AMR).

* * * * *